United States Patent [19]

Takeuchi et al.

[11] Patent Number: 5,528,574
[45] Date of Patent: Jun. 18, 1996

[54] DISK REPRODUCING APPARATUS CAPABLE OF INCREASING SPEED OF ACCESS TO DISKS RECORDED AT CONSTANT LINEAR VELOCITY

[75] Inventors: Toshifumi Takeuchi, Yokohama; Shigeki Inoue, Fujisawa; Akio Fukushima, Yokohama; Takao Arai, Yokohama; Yutaka Nagai, Yokohama, all of Japan

[73] Assignee: Hitachi, Ltd., Tokyo, Japan

[21] Appl. No.: 357,978

[22] Filed: Dec. 16, 1994

Related U.S. Application Data

[63] Continuation of Ser. No. 27,941, Mar. 8, 1993, abandoned.

[30] Foreign Application Priority Data

| Mar. 9, 1992 | [JP] | Japan | 4-050789 |
| Sep. 10, 1992 | [JP] | Japan | 4-241701 |

[51] Int. Cl.$^6$ .................................................. G11B 7/00
[52] U.S. Cl. ............................................ 369/50; 369/32
[58] Field of Search ........................... 369/44.27, 44.28, 369/44.29, 50, 54, 48, 58, 240, 41, 32

[56] References Cited

U.S. PATENT DOCUMENTS

| 4,750,059 | 6/1988 | Syracuse | 369/50 |
| 4,797,752 | 1/1989 | Giddings | 369/54 |
| 4,837,759 | 6/1989 | Miyazaki et al. | 369/32 |
| 4,873,679 | 10/1989 | Murai et al. | 369/50 |
| 4,896,311 | 1/1990 | Ishihara | 369/50 |
| 4,977,553 | 12/1990 | Yokogawa | 369/58 |
| 4,984,096 | 1/1991 | Kim | 369/54 |
| 5,001,570 | 3/1991 | Tagawa | 369/240 |
| 5,010,539 | 4/1991 | Terashima et al. | 369/50 |
| 5,051,976 | 9/1991 | Kawano et al. | 369/50 |
| 5,063,552 | 11/1991 | Shigemori | 369/50 |
| 5,093,820 | 3/1992 | Maeda et al. | 369/240 |
| 5,161,142 | 11/1992 | Okano | 369/50 |
| 5,170,386 | 12/1992 | Tateishi | 369/50 |
| 5,182,741 | 1/1993 | Maeda et al. | 369/50 |
| 5,200,944 | 4/1993 | Sauma | 369/50 |
| 5,249,170 | 9/1993 | Yoshimaru et al. | 369/54 |
| 5,265,081 | 11/1993 | Shimizume et al. | 369/50 |
| 5,315,571 | 5/1994 | Maeda et al. | 369/50 |

FOREIGN PATENT DOCUMENTS

| 59-185071 | 10/1984 | Japan. |
| 64-60863 | 3/1989 | Japan. |
| 450789 | 2/1992 | Japan. |

*Primary Examiner*—Nabil Z. Hindi
*Attorney, Agent, or Firm*—Antonelli, Terry, Stout & Kraus

[57] ABSTRACT

An optical disk reproducing apparatus for reproducing at a high access-speed an optical disk on which data has been recorded at a constant linear velocity (CLV) includes a control circuit for controlling reading of the disk recorded at a CLV to be rotated at a constant angular velocity (CAV), and a processor for changing the frequency of a reference clock to determine the processing timing of the reproduced digital signal in accordance with a transmission speed of the digital information signal picked up from the disk. A motor for driving the disk can be rotated at a constant revolution rate upon access to the disk, and thus it is possible to remove one of the factors for determining the access time in the conventional CLV type reproduction system, or the time for controlling the motor to rotate for a constant linear velocity in accordance with the position of the optical pickup.

8 Claims, 15 Drawing Sheets

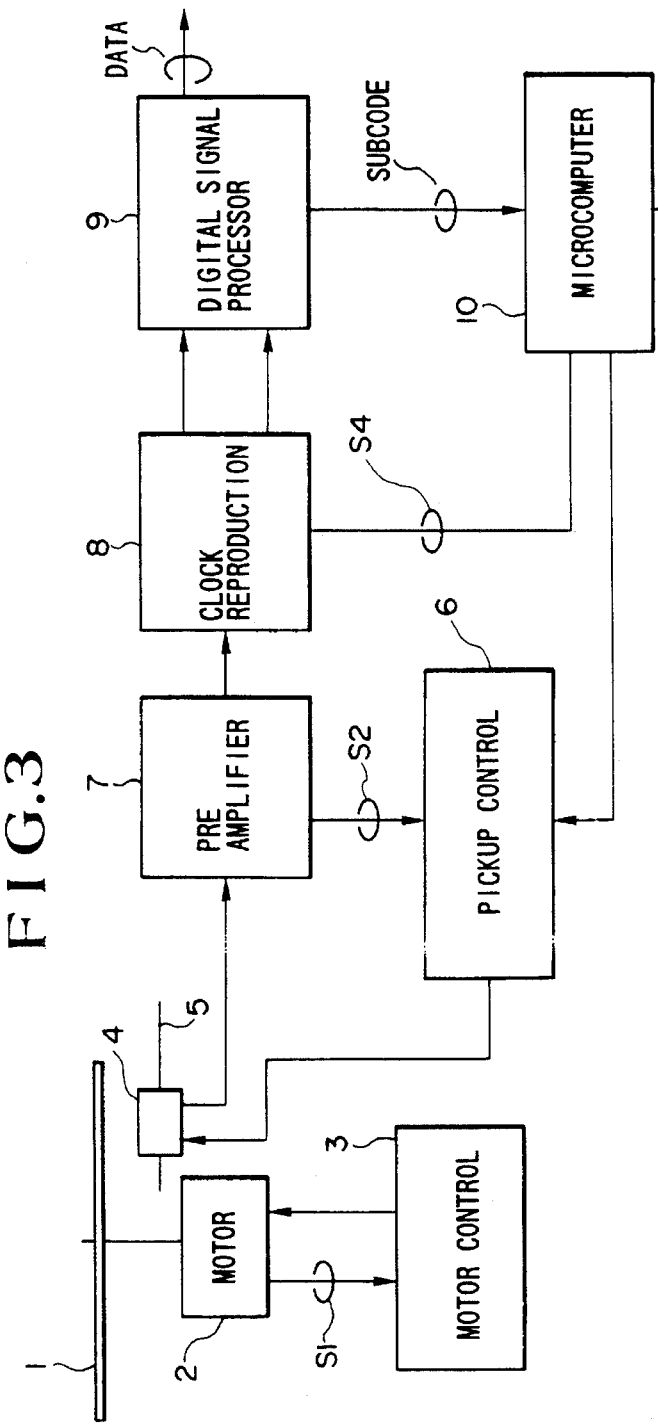
FIG.3
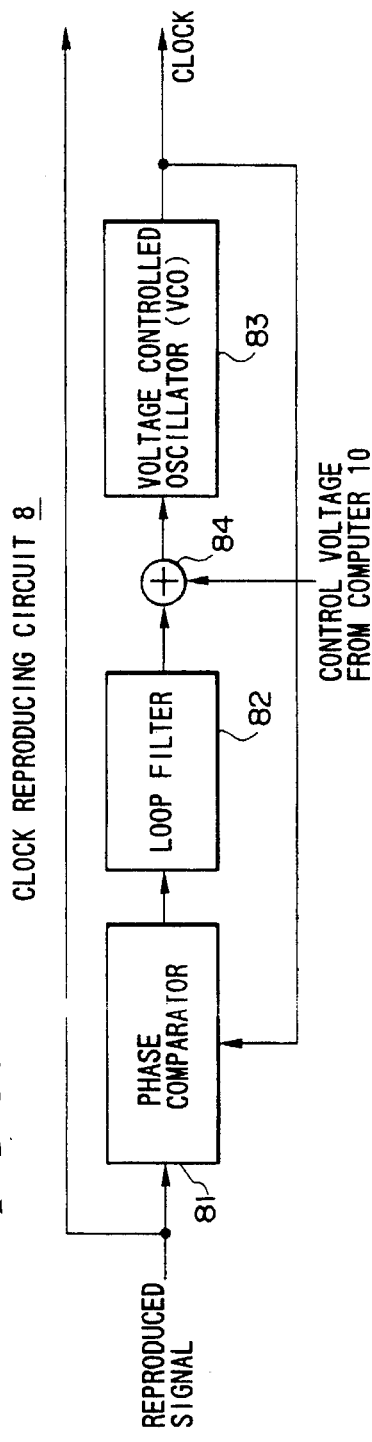
FIG.4 CLOCK REPRODUCING CIRCUIT 8

DISK REPRODUCING APPARATUS CAPABLE OF INCREASING SPEED OF ACCESS TO DISKS RECORDED AT CONSTANT LINEAR VELOCITY

This application is a continuation of Ser. No. 08/027,941, filed Mar. 8, 1993, now abandoned.

BACKGROUND OF THE INVENTION

The present invention relates to apparatus for reproducing data stored on digital-signal recorded optical disks, and particularly to a disk reproducing apparatus suitable for high-speed access to disks on which data is recorded at a constant linear velocity.

Recently, compact disk players (CD players) have been widely used as music players. The optical pickup of the CD player detects the digital data of an audio signal recorded on a compact disk. This reproduced digital data is subjected to error detection and correction processing and so on, and then is converted into the original analog audio signal. This CD player is able to perform high-speed access to the disk because the optical pickup is contactless with respect to the disk surface. In addition, the CD player is able to easily search for a desired piece of music because address information is also recorded on the disk. This compact disk (CD), when rotated, has different angular velocities at the inner and outer peripheries; in this regard the angular velocity at the outer periphery is about twice that at the inner periphery. Even if the compact disk has concentric tracks or a spiral track, it can record data at a uniform density over its entire surface. In the compact disk, data is recorded using a constant linear velocity (hereinafter, referred to as CLV) system by which the recording density can be increased as compared with a constant angular velocity (hereinafter, referred to as CAV) system. Upon reproduction, the compact disk is also controlled to rotate at a CLV as described in JP-A-59-185071.

A CD-ROM (compact disc-read-only memory) is known which is used as a CD for a data memory. When the CD-ROM used as a data memory is accessed for reading, it is necessary to reproduce (or read) recorded data at a high access speed. One of the factors for determining this access speed is the revolution rate control for the disk. Since the CD is recorded (or written) in the CLV system according to a standard, rotating this CD under CLV control upon reproduction will cause the problem that the revolution rate at the outer periphery is about twice that at the inner periphery on the CD.

Thus, if the CD is rotated under CLV control upon reproduction, the time in which the linear velocity is controlled to be constant, or the overhead time, upon access to the outer periphery from the inner periphery or to the inner periphery from the outer periphery, becomes too large to be neglected for increasing the reproduction access speed. The time in which the linear velocity is controlled to be constant depends on the performance of a drive motor for rotating the disk. So far, attempts have been made to increase access speed by improving the performance of the motor, but such increase of the access speed is limited.

JP-A-64-60863 (NEC) discloses a data recording technique for recording data using a constant linear velocity system, to increase the recording density on the disk in a recorder of the type in which the disk is rotated at a constant revolution rate, or in the CAV system recorder. In the JP-A-64-60863, however, no specific countermeasures necessary upon reproduction are presented except for features relating to the recording method.

SUMMARY OF THE INVENTION

Accordingly, in order to solve the problems in the prior art it is an object of the present invention to provide a disk reproducing method and apparatus capable of increasing the access speed when a CD of CLV recorded format or the like is reproduced.

In order to achieve the above object, in accordance with an aspect of the present invention, there is provided a reproducing apparatus including means for controlling a CLV recorded disk to rotate at a CAV through a drive motor, and means for changing a reference clock frequency which determines the time in which the reproduced digital signal is processed in accordance with a change in the transmission speed of the digital information signal (reproduced signal) reproduced from the disk by an optical pickup. Since the disk is controlled to rotate at a CAV, the revolution rate of the drive motor is constant during the reproduction access operation. Thus, it is possible to remove one of the factors for determining the access time in the CLV system, or the time for controlling the drive motor so that the linear velocity of the disk is constant everywhere the optical pickup traces on the disk. When the disk is controlled to rotate at a CAV, the transmission speed of the digital information signal picked up from the disk is changed in accordance with the position of the optical pickup. However, this change of the transmission speed can be compensated for by the means for changing a reference clock frequency which determines a timing in which a reproduced digital signal is processed, or by the change of the reference clock frequency.

BRIEF DESCRIPTION OF THE DRAWINGS

FIG. 3 is a block diagram showing a main part of a third embodiment of the optical disk reproducing apparatus of the invention.

FIG. 4 is a block diagram showing one example of the clock reproducing circuit in FIG. 3.

DESCRIPTION OF THE PREFERRED EMBODIMENTS

Embodiments of the invention will be described with reference to FIGS. 1 to 17.

Figure 1:
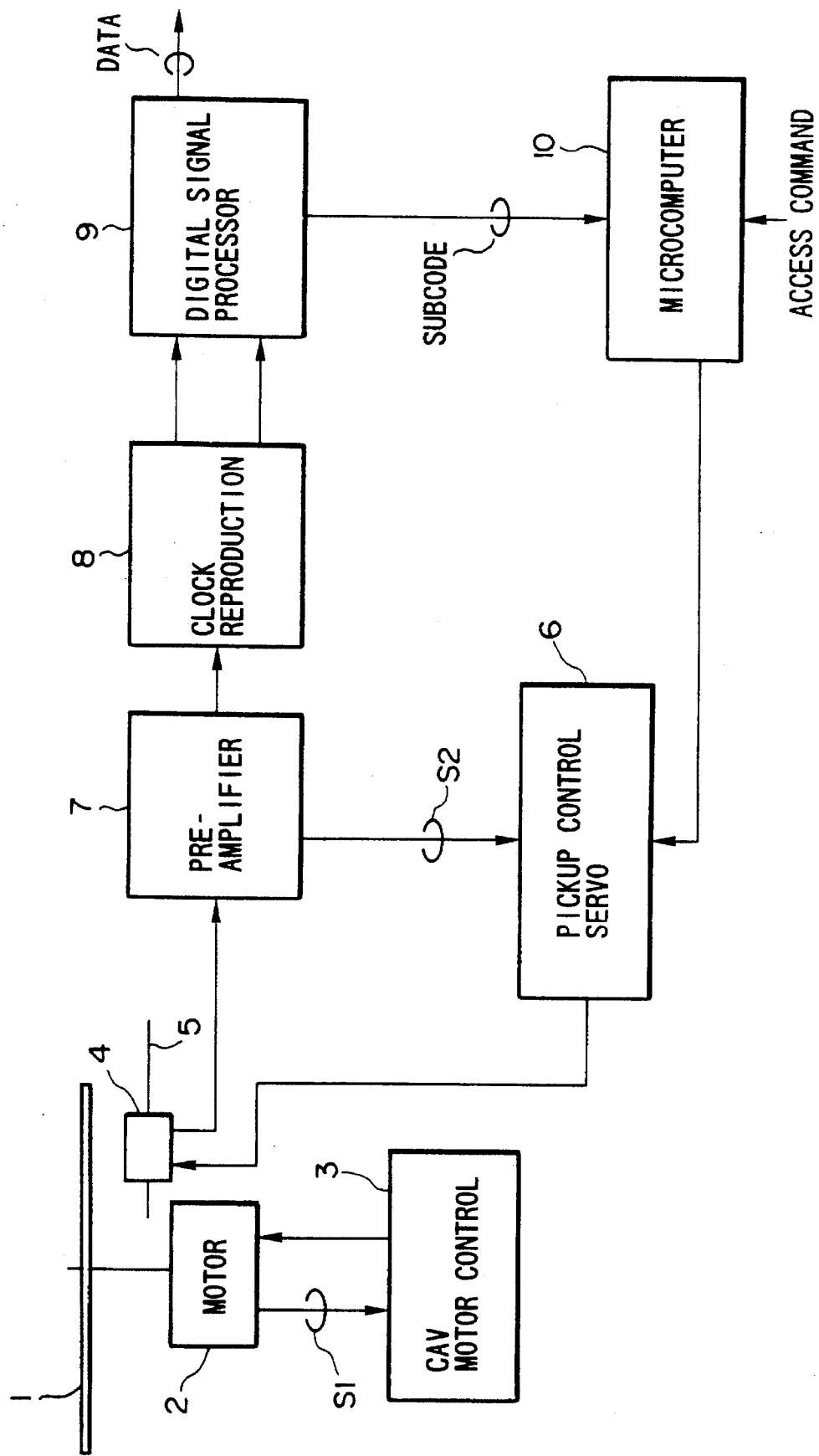
FIG. 1 is a block diagram showing a main part of a first embodiment of an optical disk reproducing apparatus of the invention.

FIG. 1 shows in block diagram a main part of a first embodiment of an optical disk recording apparatus of the invention. Referring to FIG. 1, there are shown an optical disk 1 which has a digital signal recorded thereon in a CD format using the CLV (constant linear velocity) system, a drive motor 2 for rotating the optical disk 1, and a motor control circuit 3 for controlling the motor 2 to rotate at a CAV (constant angular velocity). In addition, there are shown an optical pickup 4, a feed mechanism 5 for the optical pickup 4, and a pickup control circuit 6 for performing tracking servo control and focus control on the optical pickup 4 and for controlling the feed mechanism 5. Also shown at 7 is a preamplifier for amplifying a detected signal (reproduced signal) from the optical pickup 4, a numeral 8 denotes a clock reproducing circuit for reproducing a clock signal having the frequency of the transmission speed of the reproduced signal on the basis of the reproduced signal from the preamplifier 7, and a numeral 9 denotes a digital signal processor which receives the reproduced signal and the clock from the clock reproducing circuit 8 and makes error correction or the like according to the CD format. This digital signal processor 9 produces error-corrected data and a subcode. Shown at 10 is a microcomputer, which responds to the subcode from the processor 9 and an access command from an external apparatus to control the pickup control circuit 6 to perform an access operation.

In the disk reproducing apparatus of FIG. 1, the motor 2 supplies a revolution rate detected signal S1 to the motor control circuit 3. The motor controller 3 responds to the signal S1 to control the motor 2 to be driven at a CAV. The optical pickup 4 is controlled through the feed mechanism 5 by the pickup control circuit 6 to trace the track according to the access command within the range from the inner periphery to the outer periphery of the optical disk 1. The preamplifier 7 amplifies the signal from the optical pickup 4, and supplies an error signal S2 to the pickup control circuit 6. The preamplifier 7 also supplies the reproduced signal to the clock reproducing circuit 8. This reproduced signal is changed in its transmission speed in accordance with the position of the optical pickup 4 since the optical disk 1 is controlled to rotate at a CAV. The clock reproducing circuit 8 generates a clock signal of the transmission speed frequency synchronized with this reproduced signal, and supplies it to the digital signal processor 9. The digital signal processor 9 detects the subcode data of the reproduced signal, and supplies it to the microcomputer 10. The digital signal processor 9 also supplies the corrected data to the external apparatus, such as a host computer (not shown). The microcomputer 10 recognizes the current position of the optical pickup 1 from the picked up subcode, and calculates the amount of movement of the optical pickup up to a desired position, or track to be reproduced on the basis of the access command from the host computer or the like (not shown). Thus, the pickup control circuit 6 can be instructed to perform an access operation control on the pickup according to the calculated result from the microcomputer 10.

Therefore, during the reproduction (read) access operation, the motor is independently controlled to rotate the optical disk 1 by the CAV system. Since the optical disk 1 is always rotated at a CAV, it is possible to remove one of the factors for determining the access time in the conventional CLV system, or the time in which the motor is controlled so that the disk has a constant linear velocity in accordance with the position of the optical pickup. Thus, the reproduction access speed can be increased.

Figure 2:
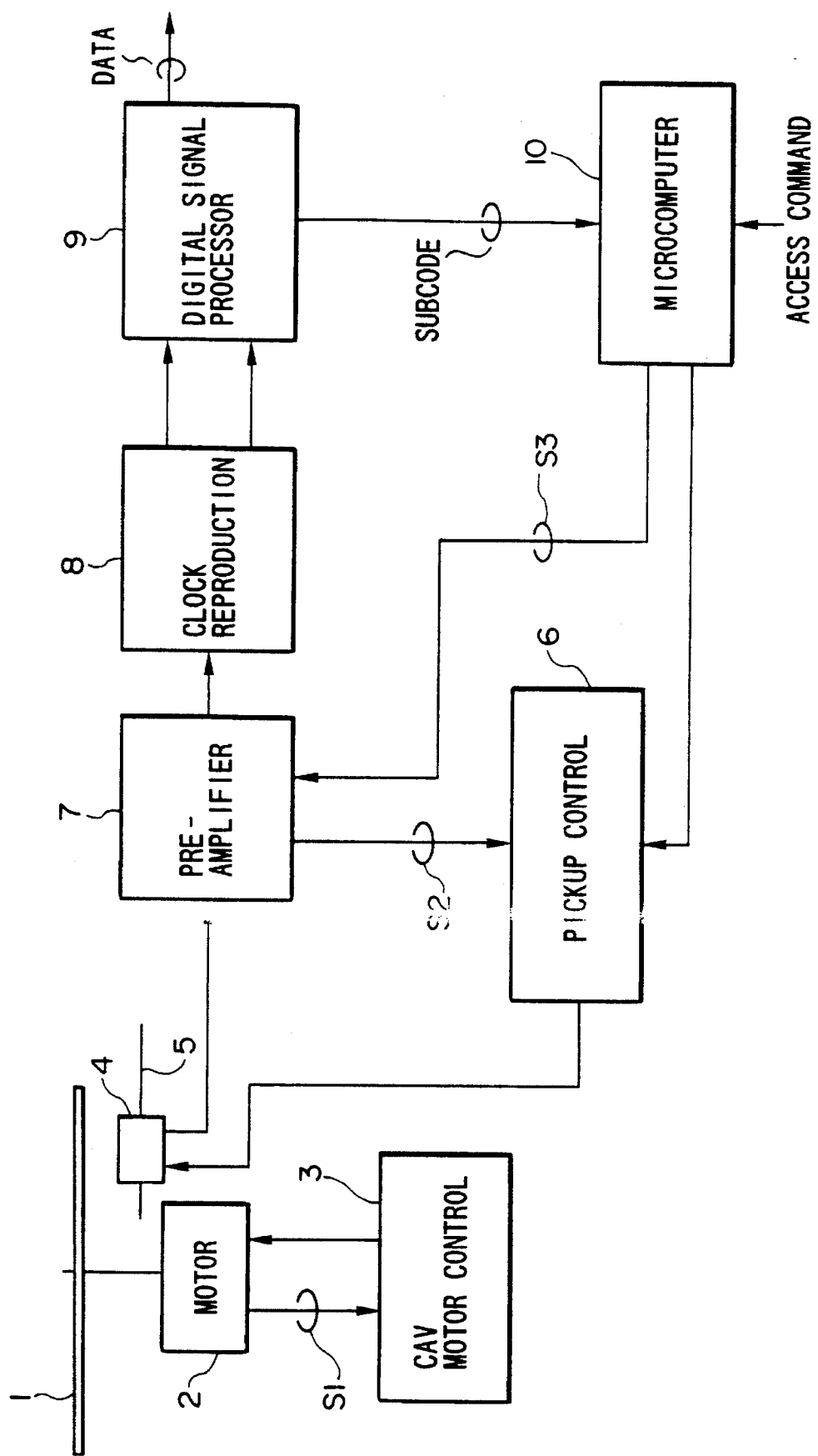
FIG. 2 is a block diagram showing a main part of a second embodiment of the optical disk reproducing apparatus of the invention.

FIG. 2 shows in block diagram a main part of a second embodiment of the optical disk reproducing apparatus of the invention. In this embodiment, the preamplifier 7 performs equalization of waveforms in order to make the transmission characteristics of optical disk and the optical pickup free from the intercode interference. In FIG. 2, like elements corresponding to those in the first embodiment of FIG. 1 are identified by the same reference numerals, and will not be described. This also applies to the embodiments which will be described later.

In general, the optical pickup can be designed to ensure that the data transmission characteristic of the optical disk is free from intercode interference. In addition, waveform equalization is sometimes performed considering the uneven characteristics of the disk and optical pickup in the production process. Referring to FIG. 2, S3 indicates a control output signal fed from the microcomputer 10 to the preamplifier 7. As will be described later, by this control output signal S3 the preamplifier 7 is instructed to perform a frequency characteristic switching for waveform equalization in accordance with the position of the optical pickup 4.

In other words, the microcomputer 10 receives the subcode data reproduced from the disk and the access command to the disk from the external apparatus and thereby recognizes the current position of the optical pickup 4 and the position to which the optical pickup will make access as described above. Therefore, the microcomputer 10 can control the preamplifier 7 to switch to the frequency characteristic for waveform equalization corresponding to the transmission speed of the reproduced signal from the position or track at which the optical disk is to trace on the disk. That is, since the transmission speed increases as the optical pickup traces the disk from the inner periphery toward the outer periphery, the frequency characteristic for waveform equalization is switched to relatively shift to the high frequency side as the optical pickup scans toward the outer periphery of the disk. If the preamplifier 7 has such a circuit arrangement as to determine the frequency characteristic by resistors or capacitors, the frequency characteristic of the preamplifier 7 can be changed by switch means of a transistor or the like for switching the resistance values or capacitance values. This can also be performed by use of a voltage controlled variable capacitor or resistor.

FIG. 3 shows in block diagram a main part of a third embodiment of the optical disk reproducing apparatus of the invention. In this embodiment, the clock reproducing circuit 8 is formed of a PLL (phase locked loop) circuit for generating a clock synchronized with the reproduced signal. Referring to FIG. 3, S4 represents a control output signal fed from the microcomputer 10 to the clock reproducing circuit 8. The control output signal S4 controls the clock reproducing circuit (PLL circuit) 8 to change the center frequency of the reproduced clock in accordance with the position of the optical pickup 4.

The PLL circuit, as is well known, has a capture range determined by the design of the loop characteristic. It is possible to design the capture range corresponding to the transmission speed difference occurring when the optical pickup traces the inner and outer peripheries of the disk. However, much time is taken for the reproduced clock to be locked. In addition, when the capture range is wide, the PLL responds to high frequency noise, and thus sometimes cannot reproduce a stable clock. According to this embodiment, the capture range is narrowed for reproduction of a stable clock, thereby making it possible to decrease the time necessary for the center frequency of the PLL circuit to be locked close to the transmission speed.

In other words, as described above, the microcomputer 10 is able to receive the subcode data and the access command and thereby recognize the current position of the optical pickup 4 and the position to which the optical pickup 4 will make access. Therefore, the microcomputer 10 can calculate the transmission speed of the signal which is to be reproduced from the position or track to which the optical pickup will make access, and it can generate the control output signal (control voltage) S4 to the clock reproducing circuit 8, thereby controlling the center frequency of the PLL.

FIG. 4 shows one example of the clock reproducing circuit 8 of the third embodiment which uses the PLL circuit. Referring to FIG. 4, there are shown a phase comparator 81, a loop filter 82, a voltage controlled type oscillator (VCO) 83, and an adder 84 for adding the output from the loop filter 82 and the control voltage S4 from the microcomputer 10. When the control voltage S4 corresponding to the position of the optical pickup 4 is supplied from the microcomputer 10 to the voltage controlled type oscillator 83, the center frequency of the oscillator 83 is determined by the control voltage S4 from the microcomputer 10. Thus, the reproduced signal is phase-locked in relation to this center frequency.

Figure 5:
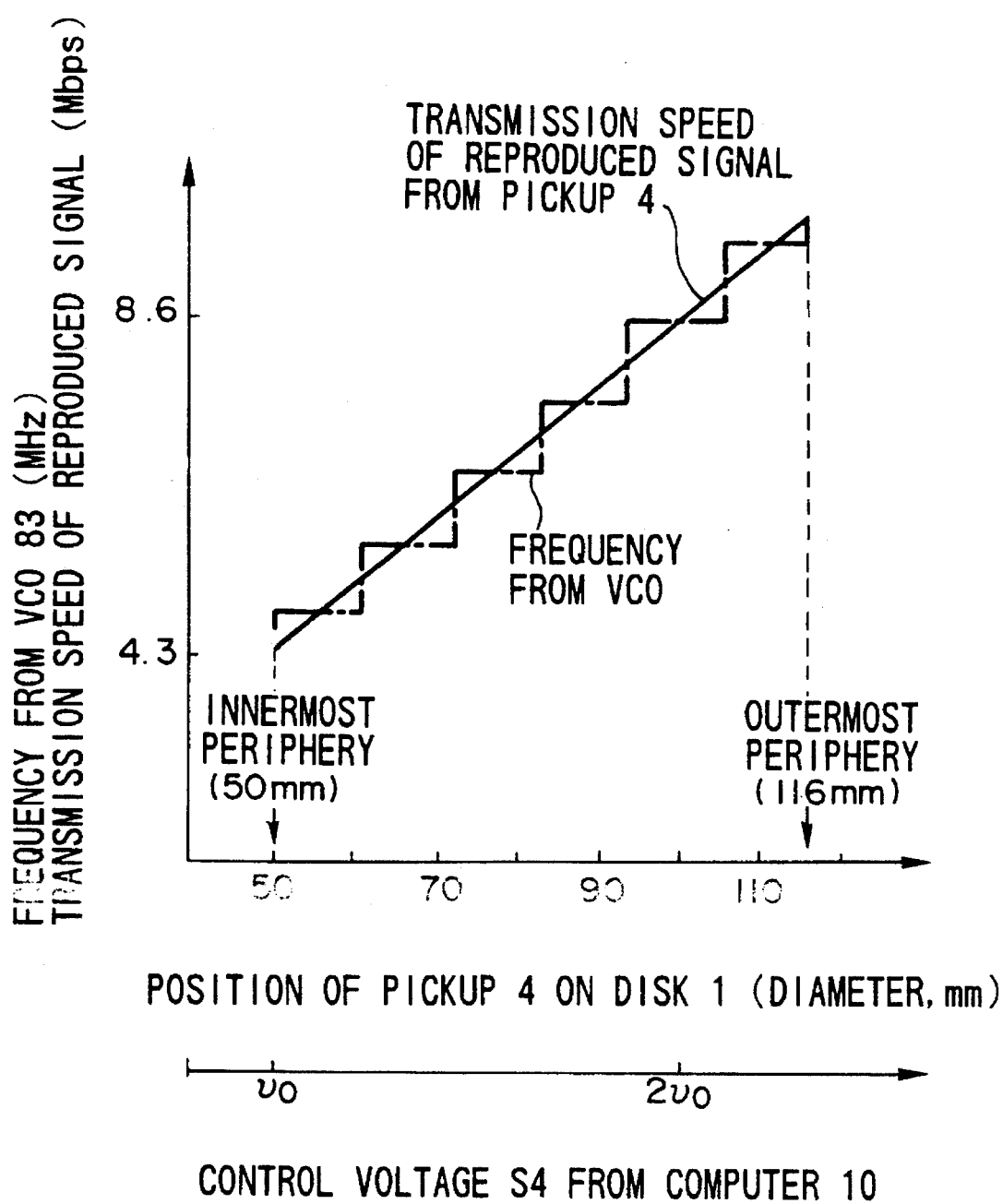
FIG. 5 is a diagram to which reference is made in explaining the control operation characteristic of the clock reproducing circuit of FIG. 4.

FIG. 5 shows the relation between the position of the optical pickup 4 and the transmission speed of the reproduced signal and the relation between the control voltage S4 from the microcomputer 10 and the frequency of the voltage controlled type oscillator 83 of FIG. 4. The control voltage S4 from the microcomputer 10 controls the frequency of the voltage controlled type oscillator 83 in association with the transmission speed. As shown in FIG. 5, a clock reproduction operation can be realized by controlling the frequency within the capture range of the PLL.

The clock reproducing circuit 8 may be constructed as a digital PLL circuit. In this case, the clock which determines the center frequency can also be controlled in the same way as in the arrangement of FIG. 4 by changing or switching the frequency dividing ratio in association with the transmission speed under the control of the microcomputer 10.

Figure 6:
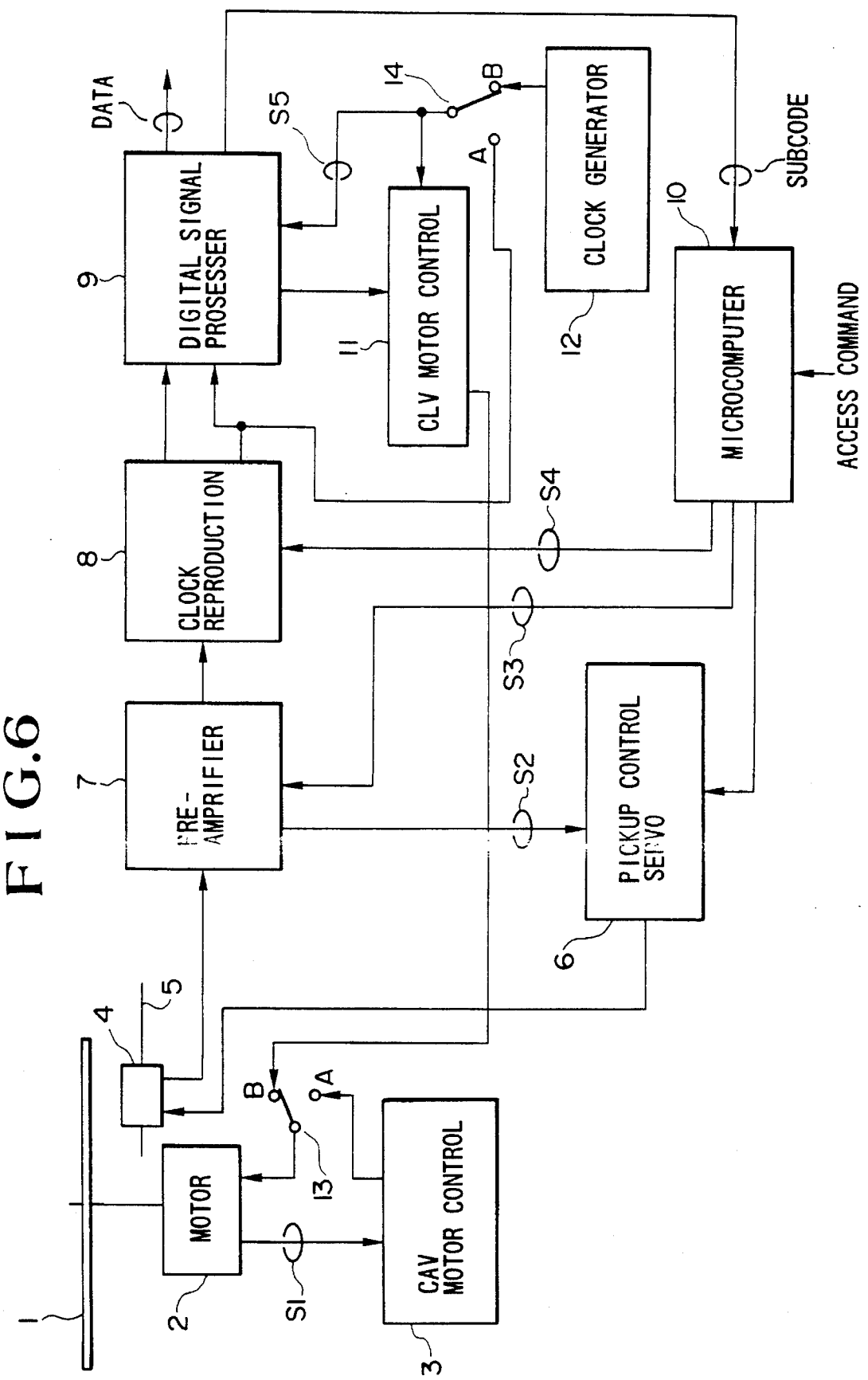
FIG. 6 is a block diagram showing a main part of a fourth embodiment of the optical disk reproducing apparatus of the invention.

FIG. 6 shows in block diagram a main part of a fourth embodiment of the invention. This embodiment enables not only the CAV control reproduction but also the CLV control of the disk rotating motor for the reproduction of music. In FIG. 6, a numeral 11 denotes a CLV motor control circuit for controlling the motor to rotate at a constant linear velocity (CLV), 12 denotes a clock generator for generating a fixed frequency, 13 and 14 denote mode change over switches, and S5 denotes clock input signal for determining the speed of data from the digital signal processor 9.

In the arrangement of FIG. 6, when the microcomputer 10 controls the switches 13 and 14 to change to an A-side position, the motor 2 is controlled to rotate for a CAV, and a data is processed in the same way as in the first to third embodiments. When the microcomputer 10 controls the switches 13 and 14 to change to a B-side position, the motor 2 is controlled to rotate for a CLV. When the motor 2 is controlled to rotate for a CLV, the clock oscillator 12 supplies a reference clock frequency to the CLV motor control circuit 11. The CLV motor control circuit 11 supplies a control voltage to the motor 2 so that the frame synchronization signal frequency indicative of the transmission speed of the reproduced signal from the digital signal processor 9 is made constant. The output from the clock oscillator 12 is also supplied to the digital signal processor 9 as the clock input signal S5 for determining the speed of the output data from the digital signal processor 9. Thus, since data can be produced at a constant frequency from the digital signal processor 9, the digital data can be converted into analog data or an audio signal by the known method.

Figure 7:
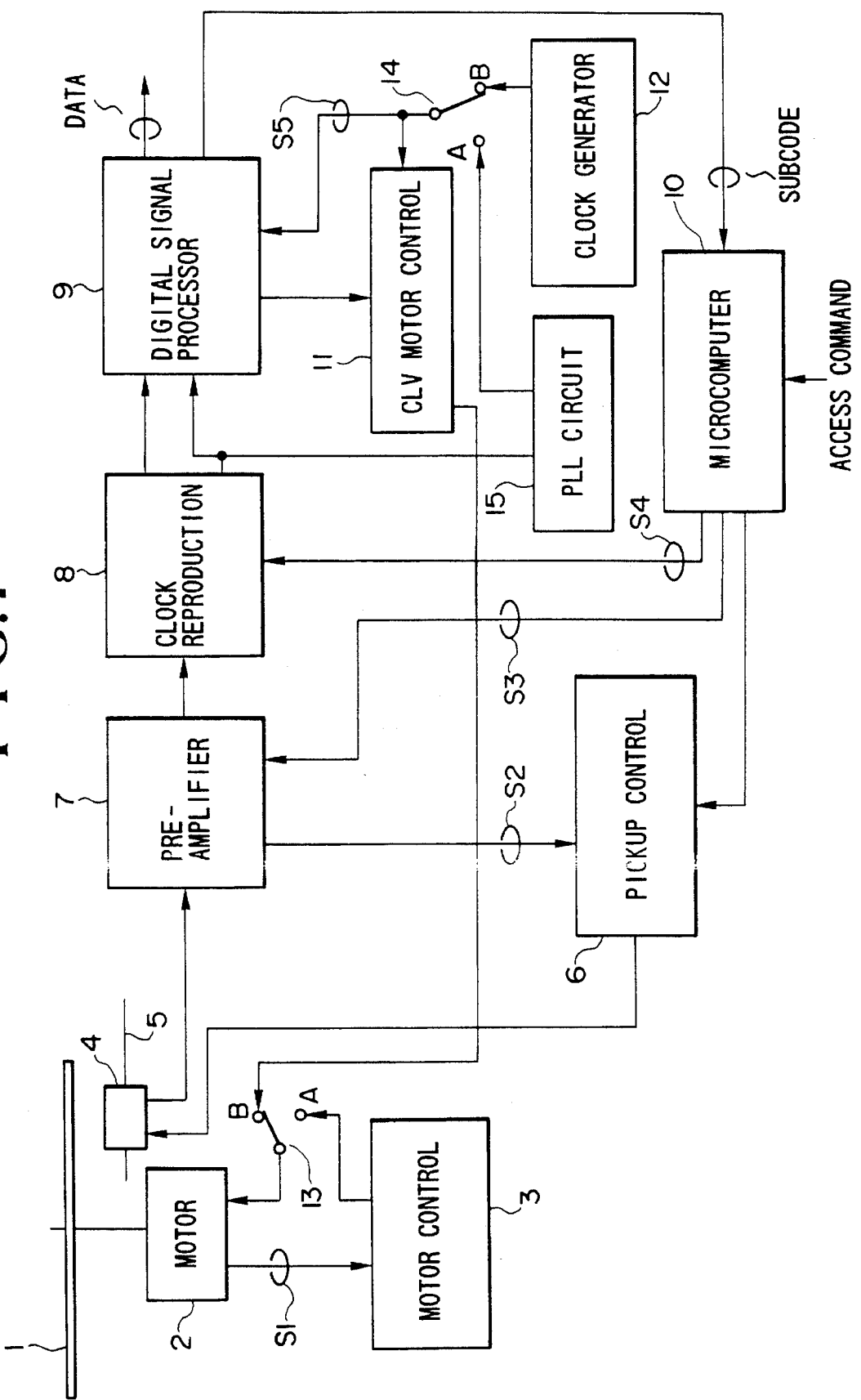
FIG. 7 is a block diagram showing a main part of a fifth embodiment of the optical disk reproducing apparatus of the invention.

FIG. 7 shows in block diagram a main part of a fifth embodiment of the invention. This embodiment is useful for the case where the clock frequency of the clock input signal S5 is not equal to the frequency of the transmission speed in contrast to the fourth embodiment of FIG. 6. In the CD player for audio reproduction, the sampling frequency, 44.1 kHz is 98 times as high as the transmission speed of the reproduced signal, or 4.3218 MHz. Although the arrangement of FIG. 6 can be used when the frequency of the clock oscillator 12 is equal to the transmission speed, the arrangement of the fifth embodiment is used if the clock input signal S5 is specified so that the sampling frequency is, for example, 96 times as high as the transmission speed, at which sampling frequency the digital signal processor 9 may process the data easily. Referring to FIG. 7, a numeral 15 represents a PLL circuit which produces a frequency of 96/98 times as low as the clock frequency from the clock reproducing circuit 8. This PLL circuit 15 assures matching between the clock frequency of the clock input signal S5 and the frequency of the transmission speed. The other constructions are the same as in FIG. 6.

Figure 8:
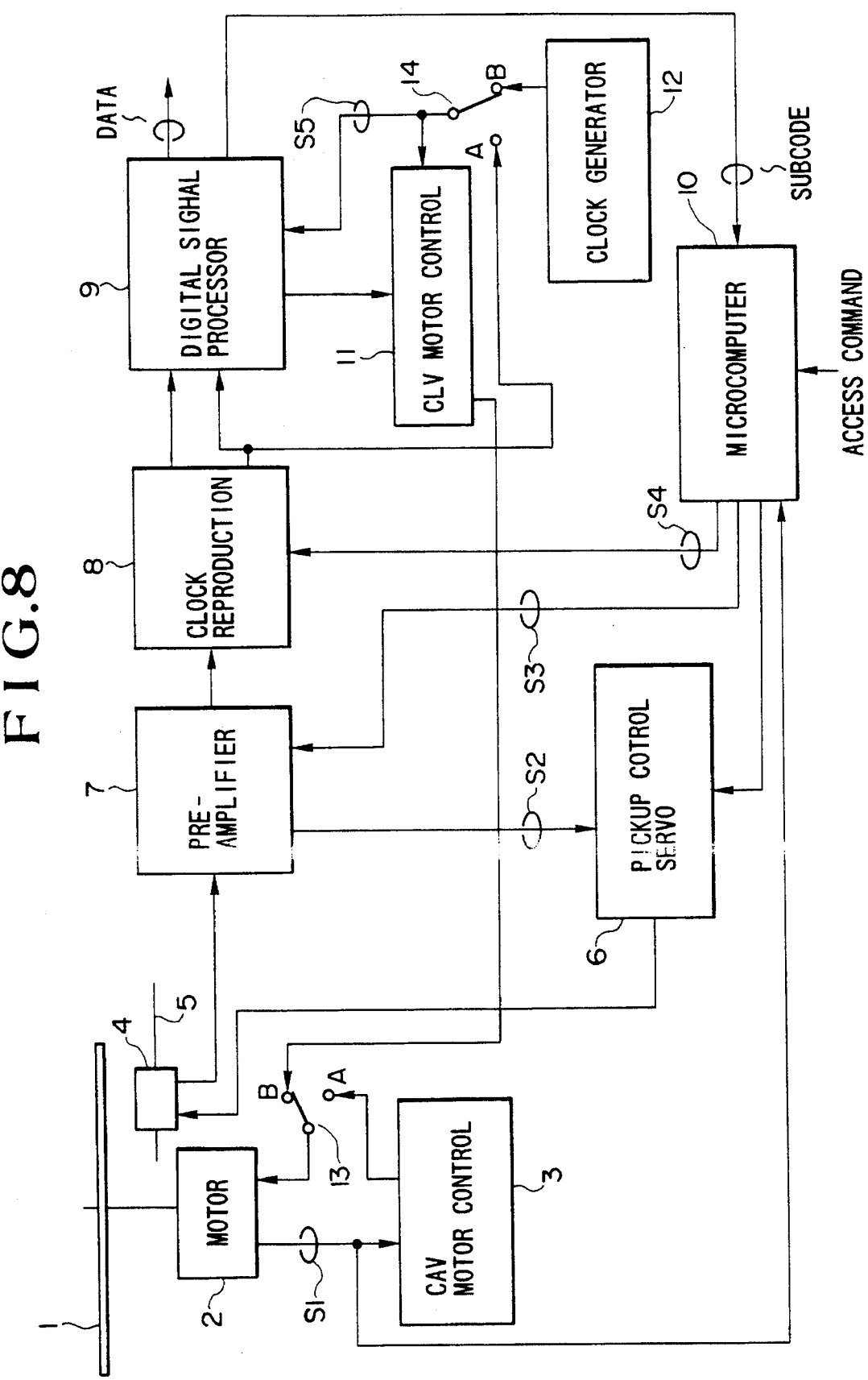
FIG. 8 is a block diagram showing a main part of a sixth embodiment of the optical disk reproducing apparatus of the invention.

FIG. 8 shows in block diagram a main part of a sixth embodiment of the invention. This embodiment is useful for the case when the linear velocity of the disk is uneven in the fourth embodiment of FIG. 6. In FIG. 8, a reference numeral 16 represents a signal line through which the revolution rate detected signal S1 from the motor 2 is supplied to the microcomputer 10. The other constructions are the same as in FIG. 6. In this embodiment, before the motor 2 is controlled for CAV, the microcomputer 10 controls the switches 13 and 14 to change to the B-side position for CLV control. At this time, the microcomputer 10 detects and recognizes the position of the optical pickup 4 from the subcode information and the revolution rate of the motor 2 from the revolution rate detected signal S1 fed through the signal line 16 and, then calculates the linear velocity of the disk on the basis of these detected data. When the motor 2 is controlled to rotate at a CAV on the basis of this information, the microcomputer 10 further calculates the relation between the position of the optical pickup 4 and the transmission speed, and controls the clock reproducing circuit 8 and the preamplifier 7, thereby enabling the reproduction processing at the time of CAV control to be performed without trouble even if the linear velocity of the disk is uneven.

In this embodiment it is necessary to provide, the revolution rate detecting means on the motor in order that the motor can be controlled to rotate at a constant revolution rate (see JP-A-4-50789). An arrangement will be mentioned in the description of the next embodiment which is capable of controlling the motor to rotate at a constant revolution rate without providing the revolution rate detecting means on the motor. In order to achieve this arrangement, when a disk recorded at a CLV, for example, a recorded disk of a music program, is normally reproduced, the disk is controlled to rotate at a constant linear velocity (CLV). In addition, when the disk is accessed from the inner periphery to the outer periphery or from the outer periphery to the inner periphery, the linear velocity is changed so that the revolution rate is constant.

Figure 9:
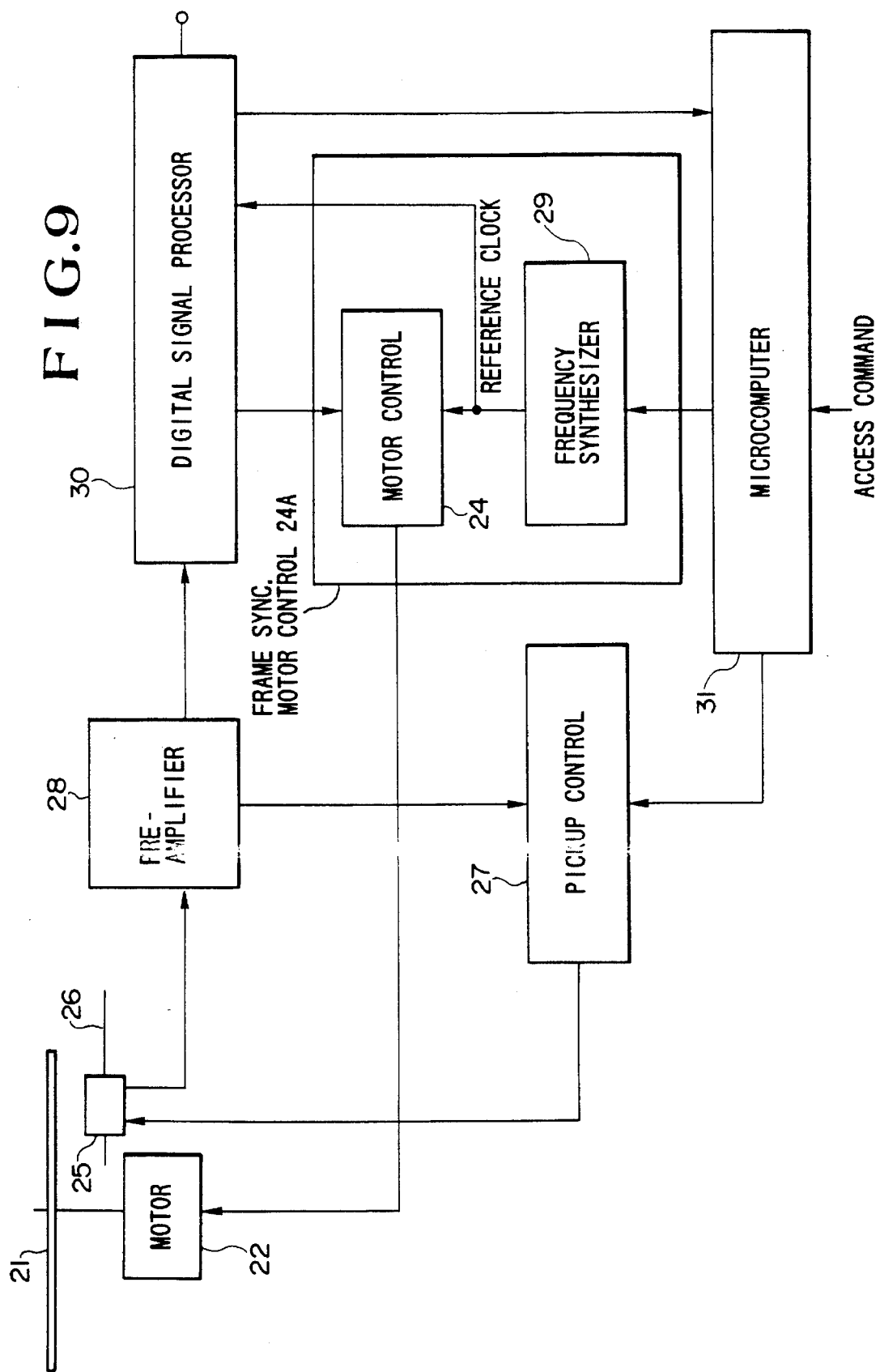
FIG. 9 is a block diagram showing a main part of a seventh embodiment of the optical disk reproducing apparatus of the invention.

FIG. 9 shows in block diagram a main part of a seventh embodiment of this invention, which has this arrangement. Referring to FIG. 9, there are shown an optical disk 21 on which a digital signal has been recorded in a CD format at a constant linear velocity, a motor 22 for rotating the optical disk 21, and a CLV motor control circuit 24 for controlling the revolution rate of the motor 22 so that the linear velocity is constant over the disk. Moreover, there are shown an optical pickup 25, a feed mechanism 26 for the optical pickup 25, a pickup control circuit 27 for performing tracking and focus control on the feed mechanism for the optical pickup 25, a preamplifier 28 for amplifying the signal from the optical pickup 25, a frequency synthesizer 29 which oscillates at an arbitrary specified frequency, and a digital signal processor 30. This digital signal processor 30 receives the reproduced signal and the clock signal from the frequency synthesizer 29, performs digital signal processing, such as error correction processing according to the CD format, and produces the error corrected data and the subcode. Also, shown at 31 is a microcomputer which is responsive to the subcode data and an access command from the external apparatus to order the control circuit 27 to perform access and to control the frequency synthesizer 29 to oscillate at a desired frequency. The motor control circuit 24 and the frequency synthesizer 29 can be integrally constructed as a frame synchronous motor control circuit 24A. This control circuit 24A produces a fixed clock signal from the synthesizer 29 under CLV motor control and changes the clock signal under CAV control.

Figure 10:
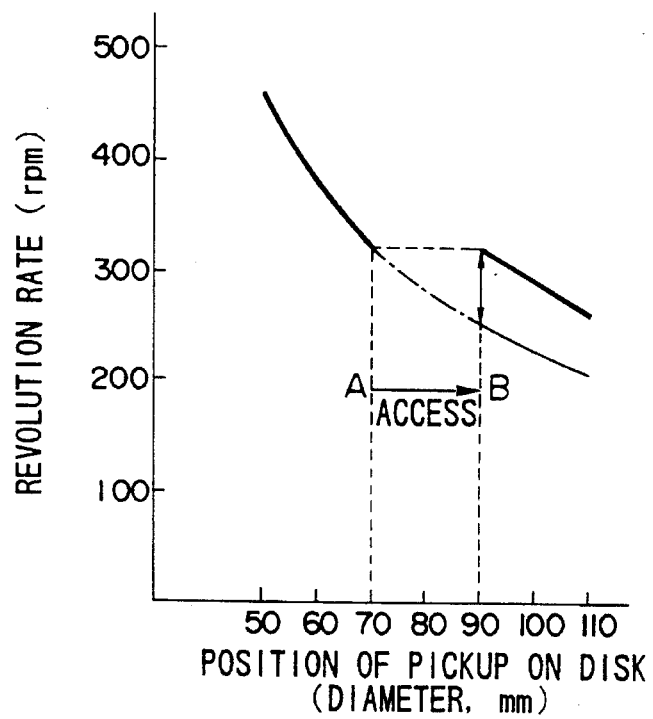
FIG. 10 is a graph showing a revolution rate of the disk in FIG. 9.
Figure 11:
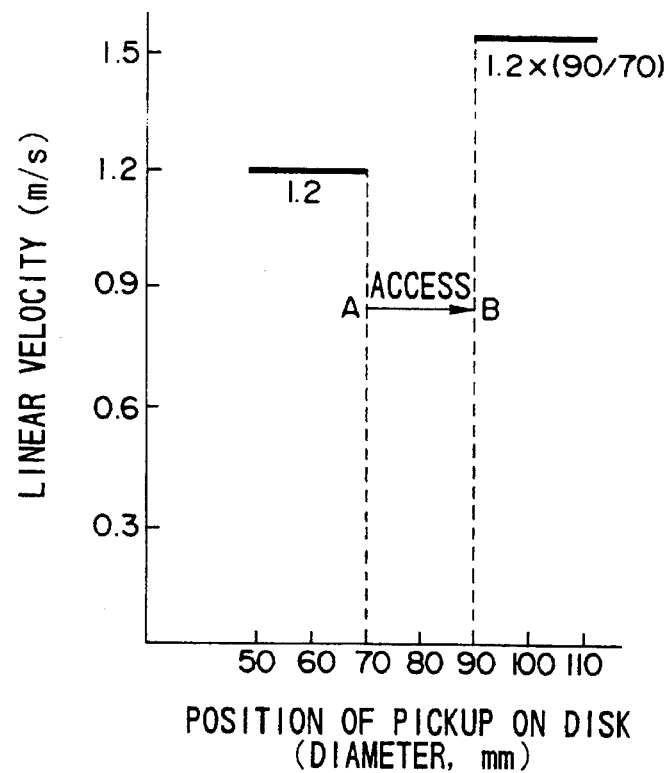
FIG. 11 is a graph showing a linear velocity of the disk in FIG. 9.

The operation of the arrangement of FIG. 9 will be described with reference to FIGS. 10 and 11. FIG. 10 is a graph showing the relation between the position of the optical pickup 25 and the revolution rate of the motor under which the optical pickup traces the optical disk 21 from point A to point B. FIG. 11 is a graph showing the relation between the position of the optical pickup 25 and the linear velocity under which the optical pickup 25 traces the optical disk 21 from point A to point B. In FIG. 9, the CLV control circuit 24 controls the motor 22 to rotate for a constant linear velocity, so that the digital signal processor 30 produces a constant frame synchronization signal frequency indicative of the transmission speed of the reproduced signal. Thus, the optical pickup 25 is enabled to trace the tracks of the optical disk 21 from the inner periphery to outer periphery by the feed mechanism 26 and the pickup control circuit 27. The preamplifier 28 amplifies the signal from the optical pickup 25, and supplies an error signal for control to the pickup control circuit 27 and the reproduced signal to the digital signal processor 30. While the reproduced signal is being continuously produced (in the interval from the innermost periphery to point A, and the interval from point B to the outermost periphery in FIGS. 10 and 11), the optical disk 21 is controlled to rotate at a constant linear velocity, or the transmission speed is constant. The digital signal processor 30 detects the subcode data of the reproduced signal and supplies it to the microcomputer 31. In addition, the processor 30 produces the corrected data and supplies it to a host computer or the like (not shown in FIG. 9).

Figure 12:
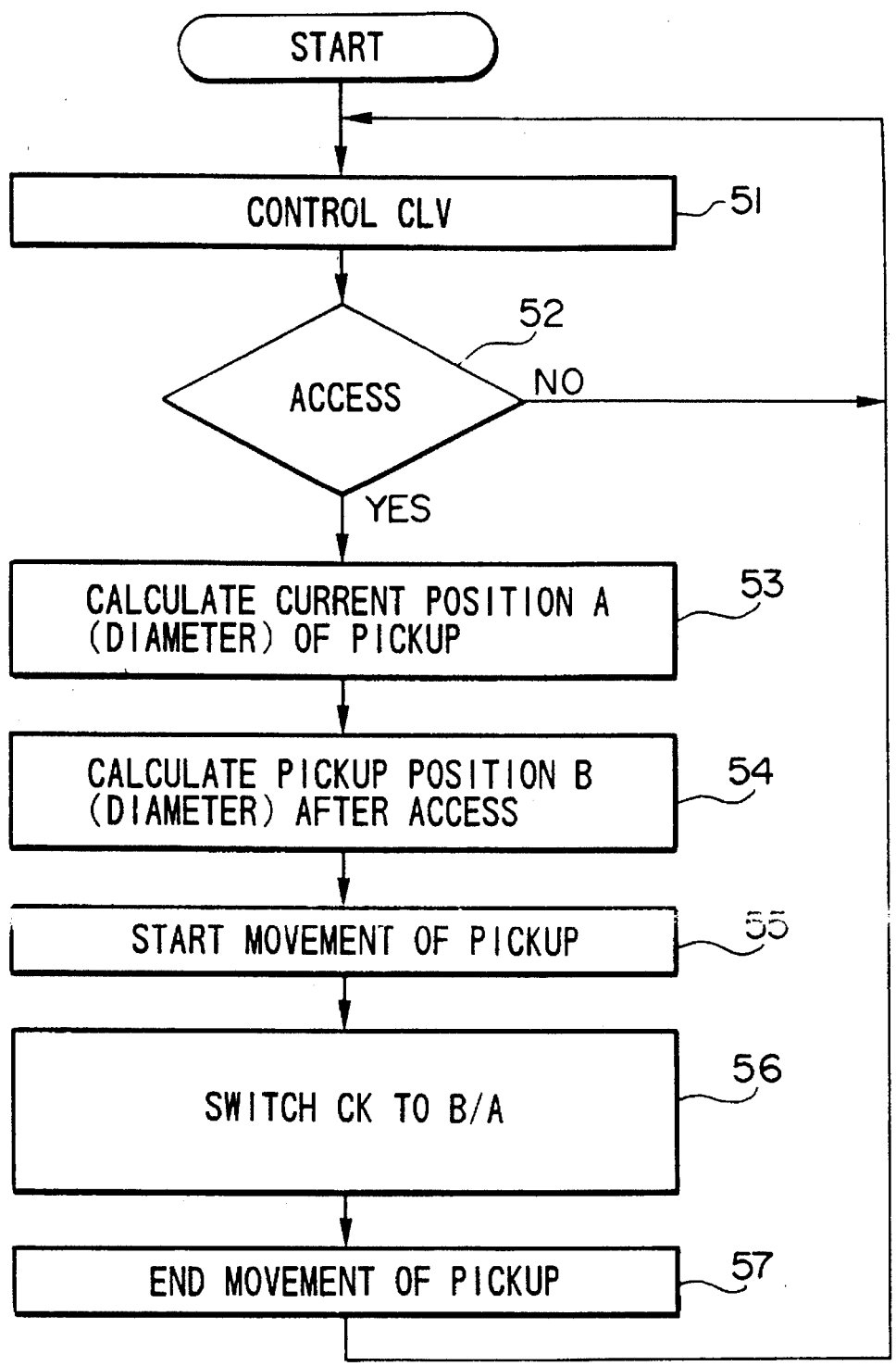
FIG. 12 is a flowchart showing an operation of the seventh embodiment of FIG. 9.

The operation for the access to a particular range (from point A to point B in FIGS. 10 and 11) will be described below. The microcomputer 31 receives an access command from a host computer or the like (not shown), detects the current position of the optical pickup 21 from the subcode, calculates a desired position up to which the optical pickup traces, and instructs the pickup control circuit 27 to perform the access control on the optical pickup. At the same time, the microcomputer 31 supplies a control signal to the frequency synthesizer 29, controlling it to change the oscillation frequency, of the reference clock signal which is fed to the CLV motor control circuit 24 and the digital signal processor 30. A specific example of the frequency control will be given below. In FIG. 10, if the disk is controlled to rotate at a CLV, the revolution rate is reversely proportional to the position (diameter) of the track which the optical pickup is tracing. Thus, when the optical pickup traces from point A to point B, the revolution rate of the motor 22 under CLV control is reduced to 70/90 as indicated by the broken line. Therefore, under a CLV control, the revolution rate of the motor 22 must be reduced by C when the range from point A to point B is accessed. According to this embodiment, at the time of access to the point B from point A, the oscillation frequency of the frequency synthesizer 29 is increased to 90/70 times as high as the rate at the position 70. Thus, the CLV motor control circuit 24 controls the linear speed to change to a target value of 90/70 times the rate at the position 70, or the motor 2 is rotated so that the linear velocity at position 90 is 90/70 times as high as that at the position 70. Therefore, the revolution rate at point A is equal to that at point B. Since the linear velocity is increased to 90/70 times, the transmission speed of the digital information signal picked up from the disk 21 is also increased to 90/70 times. On the other hand, the frequency of the reference clock fed to the digital signal processor 30 is also increased to 90/70 times. Thus, the signal processing rate is also increased in accordance with the transmission speed, so that the data can be correctly reproduced. FIG. 12 is a flowchart (steps 51 to 57) of the operation for the access. According to this embodiment, since the revolution rate of the motor 22 is not changed during the access from point A to point B, the time for the access can be reduced.

Figure 13:
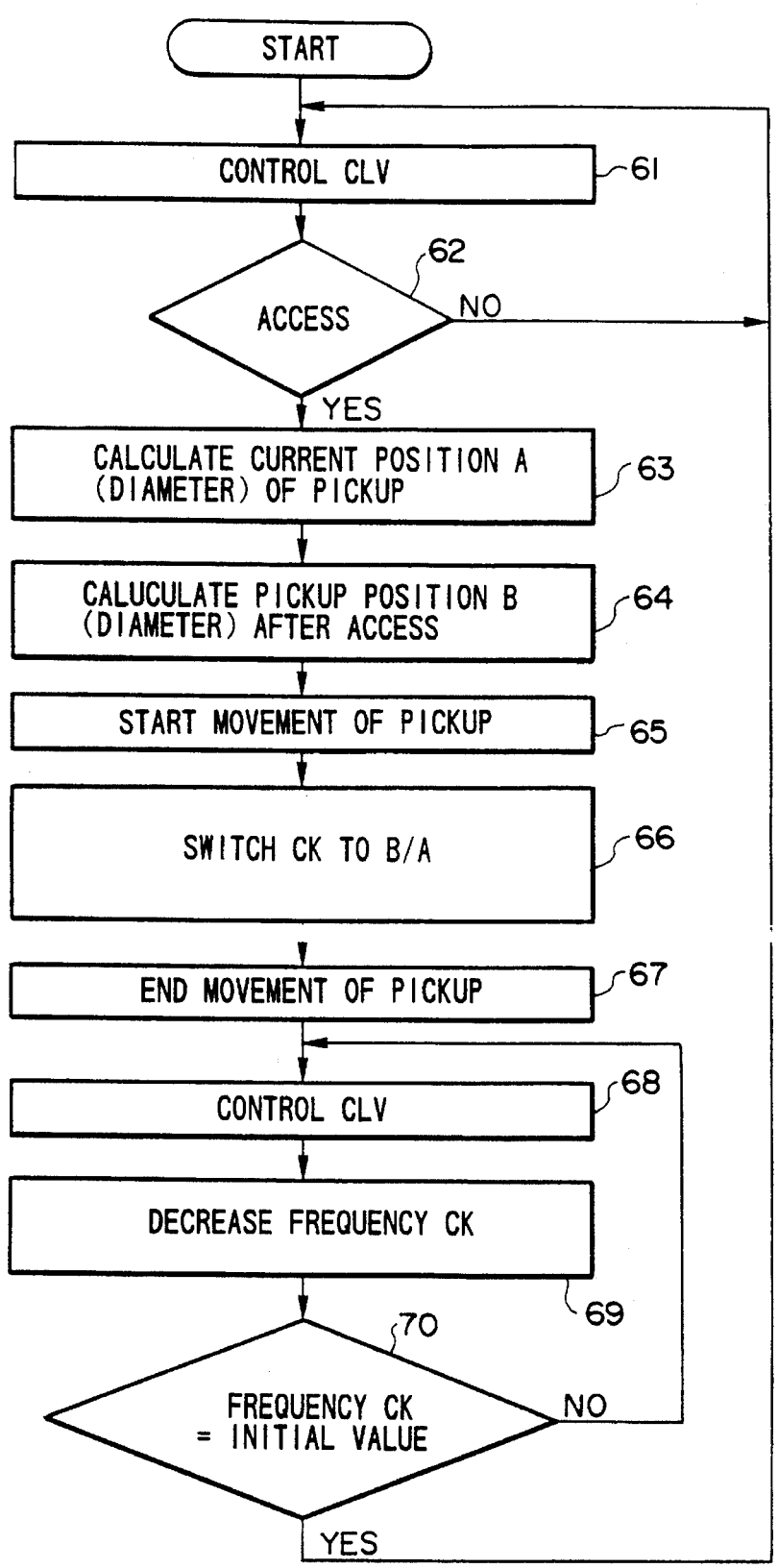
FIG. 13 is a flowchart showing another operation of the seventh embodiment of FIG. 9.
Figure 14:
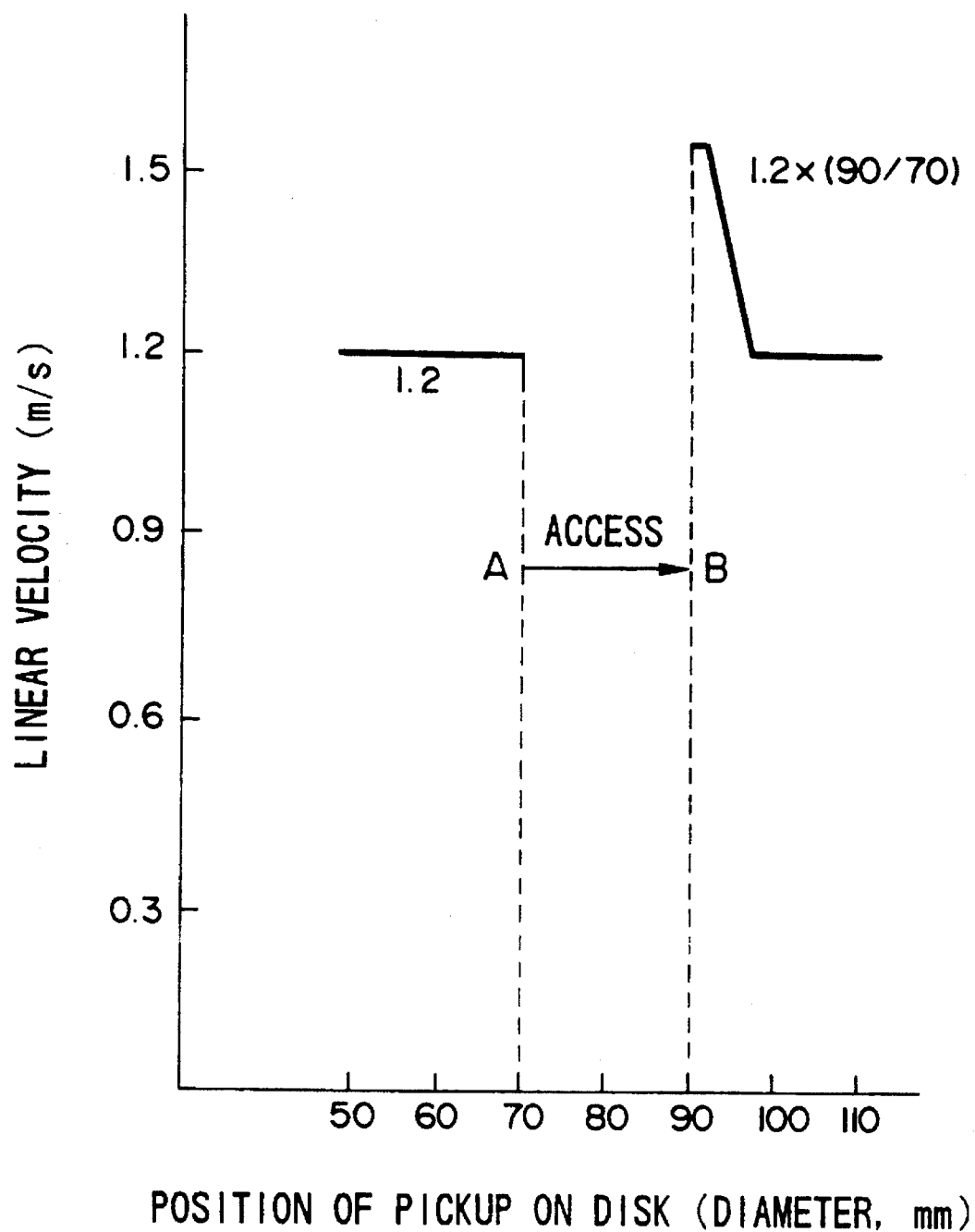
FIG. 14 is a graph showing the linear velocity of the disk in FIG. 9.

Another embodiment of the invention will be described with reference to FIGS. 13 to 14. This embodiment is obtained by changing the manner of control by the microcomputer 31 in the disk reproducing apparatus shown in FIG. 9. The operation will be mentioned with reference to the flowchart of FIG. 13 including steps 61 to 70. The operation (steps 61 to 67) in the flowchart of FIG. 13 is the same as that (steps 51 to 57) in the flowchart of FIG. 12. Thus, the operation after the end of the pickup movement will be described. After the end of the pickup movement, while the constant linear velocity control is being performed (step 68), the reference CK frequency is gradually decreased (step 69). In other words, the target value of linear velocity is gradually decreased. Therefore, after the end of the access, the linear velocity of the rotation of the disk is first increased to 1.2×(90/70) m/s, and then gradually decreased to 1.2 m/s as shown in FIG. 14. (step 70). According to this embodiment, since the revolution rate of the motor 22 is not changed upon access, the time for the access can be reduced. In addition, since the linear velocity is temporarily changed upon access, the transmission speed of the output data from the digital signal processor can be made constant with ease.

Figure 15:
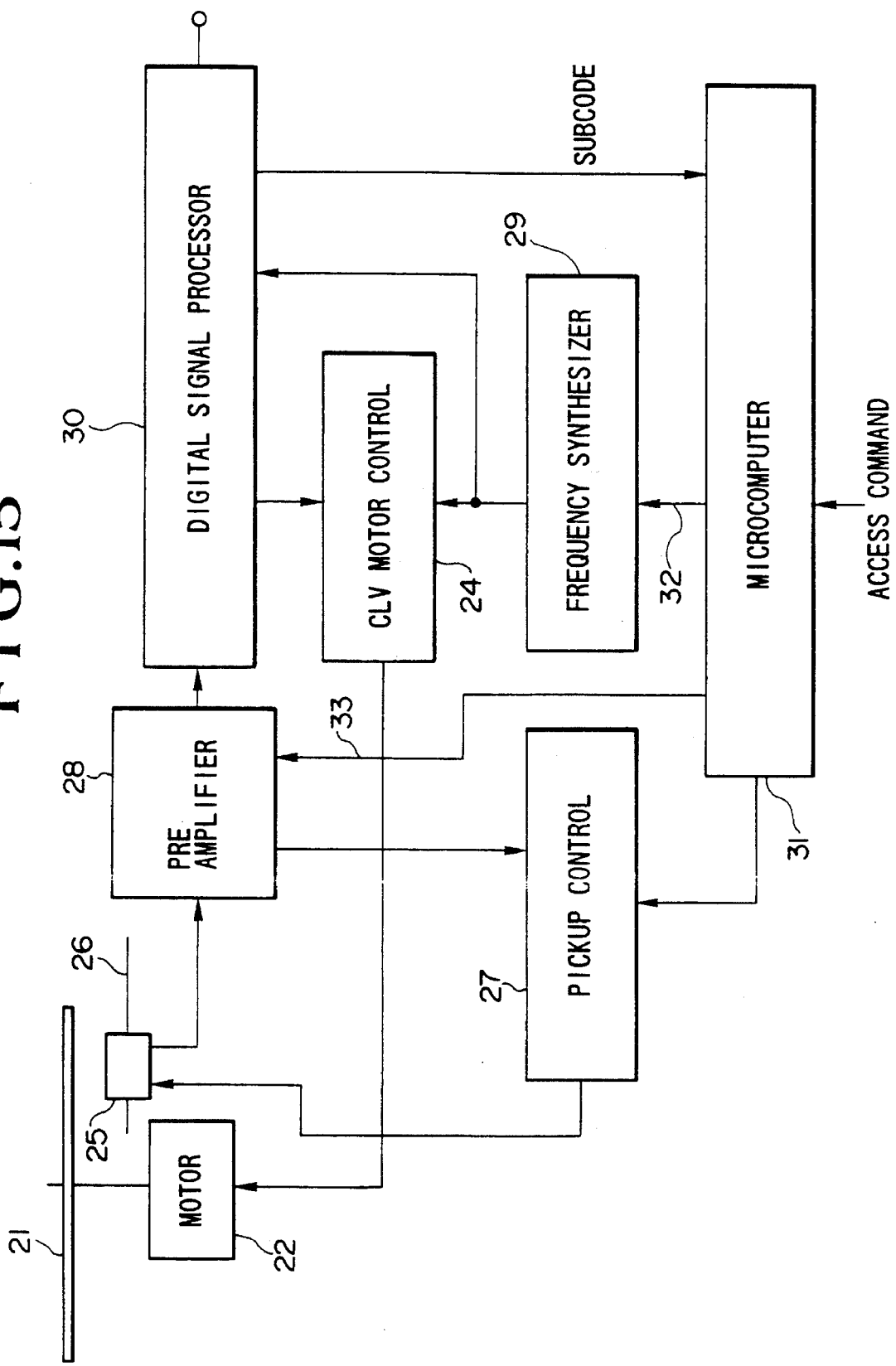
FIG. 15 is a block diagram showing a main part of an eighth embodiment of the optical disk reproducing apparatus of the invention.

FIG. 15 shows in block diagram a main part of an eighth embodiment of the invention. In this embodiment, waveform equalization is carried out in the preamplifier 28 so that the transmission characteristics of the optical disk 21 and the optical pickup 25 are free from intercode interference. In general, the optical pickup can be designed to satisfy the condition that the transmission characteristic of the optical disk has no intercode interference. The waveform equalization is sometimes performed considering the uneven characteristics of the disk and optical pickup which occur when they are manufactured.

Referring to FIG. 15, there is shown a line 33 through which the microcomputer 31 instructs the preamplifier 28 to change its frequency characteristic for the waveform equalization according to the position of the optical pickup 25. The other constructions are the same as in FIG. 9.

The microcomputer 31 can detect the current position of the pickup 25, and the position of the track which the pickup is to trace, from the received subcode data and access command. Thus, it can control the preamplifier to change the frequency characteristic for the waveform equalization according to the transmission speed of the reproduced signal from the accessed track. Since the transmission speed is increased as the pickup goes to the outer periphery of the disk, the frequency characteristic for the waveform equalization is changed to relatively shift to the high-frequency side as the pickup goes to the outer periphery of the disk. When the frequency characteristic of the preamplifier 28 is determined by resistors and capacitors used in its circuit arrangement, the resistance values and capacitance values are switched by switching means, such as transistors, to thereby change the frequency characteristic of the amplifier. This can also be achieved by voltage controlled type variable capacitors and resistors.

Figure 16:
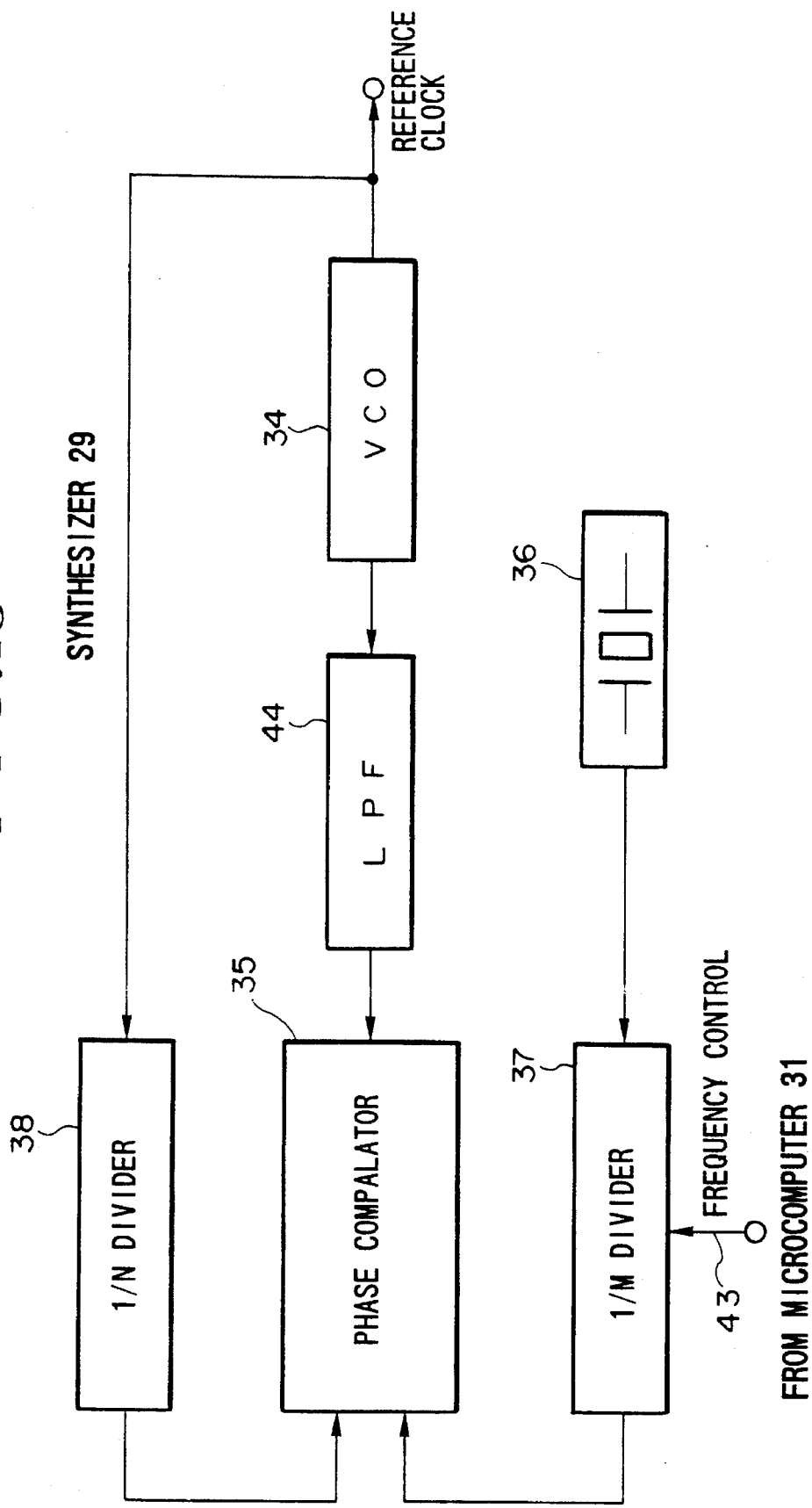
FIG. 16 is a block diagram showing a main part of the frequency synthesizer in FIG. 9.

FIG. 16 shows one example of the frequency synthesizer 29. Referring to FIG. 16, there are shown a phase comparator 35, a loop filter 44, a voltage controlled type oscillator (VCO) 34, a variable frequency divider 37 of which the dividing ratio can be changed, a frequency divider 38 and a crystal oscillator 36. The microcomputer 31 supplies a frequency control signal 43 to the frequency divider, thereby setting the dividing ratio. Since the voltage controlled type oscillator 34 is controlled so that the frequency from the frequency divider 37 is equal to that from the frequency divider 38, the voltage controlled type oscillator 34 can be oscillated at a set frequency by changing the dividing ratio of the frequency divider 37.

Figure 17:
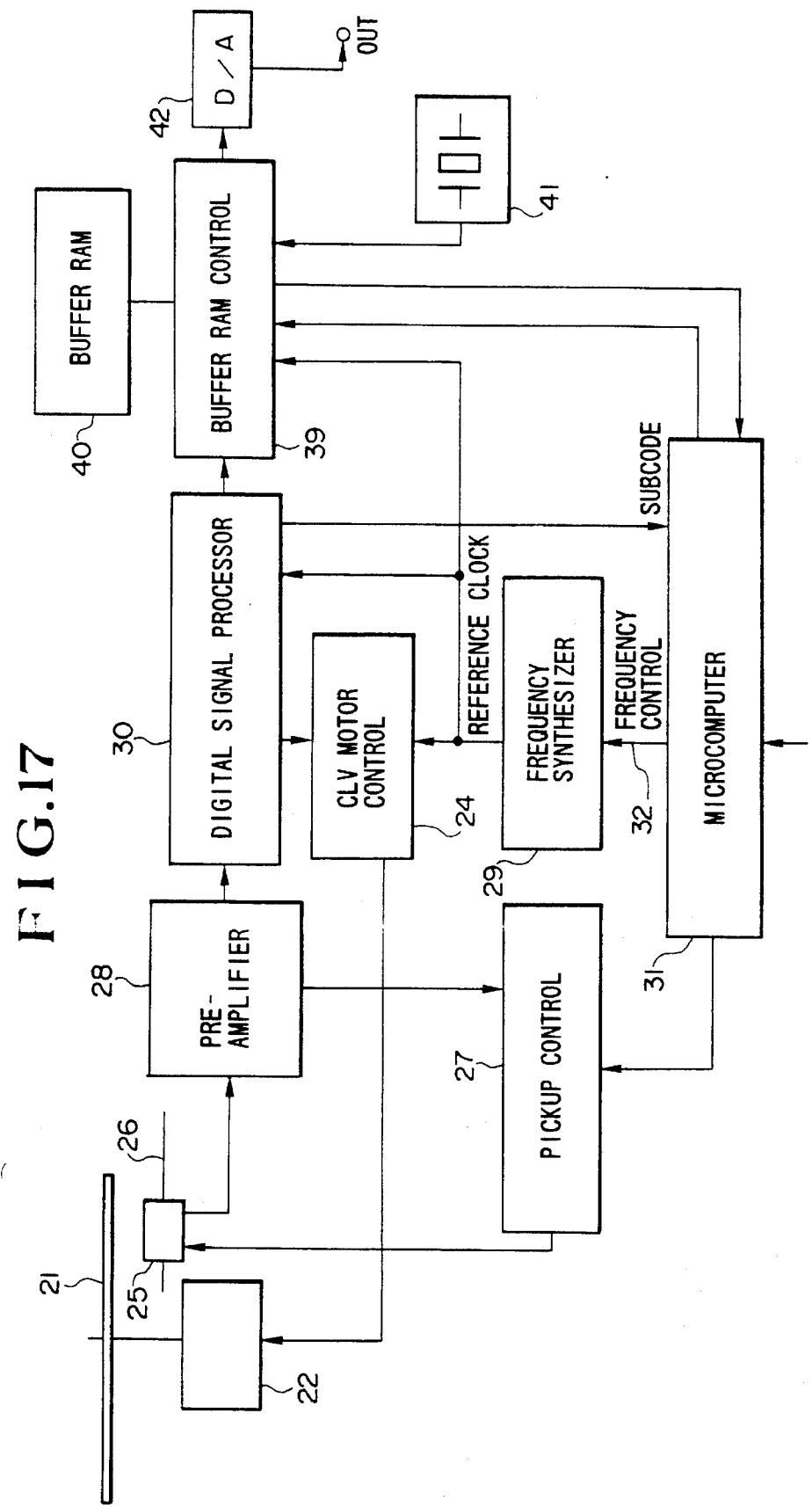
FIG. 17 is a block diagram showing a main part of a ninth embodiment of the optical disk reproducing apparatus of the invention.

FIG. 17 shows in block diagram, a main part of a ninth embodiment of the invention. This embodiment is an application of the invention to the reproduction of an audio PCM signal recorded on a disk. This embodiment involves the addition of a buffer RAM control circuit 39, a buffer RAM 40, a crystal oscillator 41 and a D/A converter 42 to the arrangement of FIG. 9. The buffer RAM control circuit 39 responds to the reference clock signal from the frequency synthesizer 29 to produce a timing signal, and controls the data produced from the digital signal processor 30 to be written in the buffer RAM 40 in accordance with the timing signal. In addition, the buffer RAM control circuit 39 generates another timing signal on the basis of the reference clock signal having an integral multiple of the sampling frequency, and controls the data written in the buffer RAM 40 to be read in accordance with this timing signal so that the data can be supplied to the D/A converter 42 at a constant speed independently of the change of the transmission speed. Therefore, even if the transmission speed is changed at each time of access, the audio signal can be correctly reproduced. Moreover, when the transmission speed of the signal reproduced from a miniature disk or the like is higher than that of the signal from the D/A converter, the buffer RAM is required to absorb the difference between those transmission speeds upon repetitive access, and thus this embodiment is suitable particularly for this case. In addition, when a data dropout is caused by a vibration, and when shock proof for reading data from the buffer RAM is performed until the disk is again accessed, the time of access to the disk becomes short, and thus the capacity of the buffer RAM may be reduced. Particularly, if the embodiments shown in FIGS. 13 and 14 are combined, the average amount of change of transmission speed can be reduced and thus the capacity of the RAM can be further reduced.

What is claimed is:

1. A disk reproducing apparatus comprising:

drive means for rotating a disk on which a digital information signal with an error correction code has been spirally recorded in a predetermined recording format at a constant linear velocity over the range from an inner periphery to an outer periphery of the disk or from the outer periphery to the inner periphery;

a constant linear velocity controller for controlling said drive means to effect constant linear velocity control of rotation of said disk;

read means for picking up said digital information signal from said disk driven by said drive means;

signal processing means for performing digital information signal processing including decoding of said error correction code with respect to said digital information signal picked up by said read means;

linear velocity setting means for selecting a linear velocity from among a plurality of temporarily settable linear velocities of the disk, in accordance with information indicative of a position of said read means on the disk when said read means moves to access said disk, and subsequently switching a set linear velocity to be gradually selected from said selected set linear velocity to a set linear velocity prior to the selection of the set linear velocity; and a frequency synthesizer changing a frequency of a basic clock for said signal processing means, in accordance with the linear velocity set by said linear velocity setting means.

2. A disk reproducing apparatus, comprising:

drive means for rotating a disk on which a digital information signal with an error correction code has been spirally recorded in a predetermined recording format at a constant linear velocity over the range from an inner periphery to an outer periphery of the disk or from the outer periphery to the inner periphery;

a constant linear velocity controller for controlling said drive means to effect constant linear velocity control of rotation of said disk;

read means for picking up said digital information signal from said disk driven by said drive means;

signal processing means for performing digital information signal processing including decoding of said error correction code with respect to said digital information signal picked up by said read means;

linear velocity setting means for selecting a linear velocity from among a plurality of temporarily settable linear velocities of the disk in accordance with information indicative of a position of said read means on the disk when said read means moves to access said disk, and subsequently switching a set linear velocity to be gradually selected from said selected set linear velocity to a set linear velocity prior to the selection of the set linear velocity, wherein said constant linear velocity controller controls the constant linear velocity based on a difference signal between a reference signal and a transmission rate of the reproduced signal from said read means; and a frequency synthesizer changing a frequency of a basic clock for said signal processing means, in accordance with the linear velocity set by said linear velocity setting means, said reference signal being produced from said basic clock.

3. A disk reproducing apparatus according to claim 2, wherein said linear velocity setting means changes the frequency of the reference signal.

4. A CLV disk reproducing apparatus comprising:

drive means for rotating a disk on which a digital information signal with an error correction code has been spirally recorded in a predetermined recording format at a constant linear velocity over the range from an inner periphery to an outer periphery of the disk or from the outer periphery to the inner periphery;

a constant linear velocity controller for controlling said drive means to effect constant linear velocity control of rotation of said disk in response to a received clock signal;

read means moveable across the periphery of said disk for picking up digital information from a designated access area of said disk; and variable frequency generator means for supplying said clock signal to said constant linear velocity controller; and access control means responsive to movement of said movable read means to a designated position in accordance with an access command for controlling the frequency of said variable frequency oscillator generating a basic clock to the constant linear velocity controller so as to not substantially change a rotation angular velocity of said disk between the start and end of the temporal movement of the read means and subsequently gradually restore the frequency of the variable frequency oscillator at a value taken before movement of said read means.

5. A CLV disk reproducing apparatus according to claim 4, further including a digital signal processor for processing digital information picked up by said read means, including means for controlling the speed of digital information processing using said clock signal supplied by said variable frequency generator means and a signal obtained from said picked up digital information, so that said processing speed varies as said read means scans across said designated access area.

6. A constant linear velocity (CLV) disk reproducing apparatus, comprising:

CLV setting means for setting a constant linear velocity of the disk;

a disk motor for rotating the disk;

an optical pick-up for picking a signal up from said disk rotated by said disk motor;

optical pick-up moving means for moving said optical pick-up in accordance with an access command; and a CLV controller for controlling said disk motor in accordance with the constant linear velocity set by said CLV setting means;

wherein said CLV setting means includes:

means for holding a predetermined value of the linear velocity set regardless of the position of the optical pick-up in the radial direction of the disk, during normal reproduction, means for switching the setting of the linear velocity of the disk so as to maintain minimal variation of the disk rotation angular velocity at the start and end of access to the disk upon movement of the optical pick-up for access, and means for gradually switching said setting of the linear velocity to the predetermined value of linear velocity set regardless of the position of the optical pick-up, after movement of the optical pick-up.

7. An apparatus according to claim 6, wherein said linear velocity setting switching means includes a target value of zero for the variation of the rotation linear velocity.

8. In a CLV disk reproducing apparatus including:

CLV setting means for setting a constant linear velocity of the disk, a disk motor for rotating the disk, optical pick-up for picking a signal up from the disk, optical pick-up moving means for moving said optical pick-up in accordance with an access command, and a CLV controller for controlling said disk motor in accordance with the constant linear velocity set by said CLV setting means, a disk reproducing method comprising the steps of:

holding, utilizing said CLV setting means, a predetermined value of the constant linear velocity set regardless from the position of said optical pick-up in a radial direction of the disk, during normal reproduction;

switching the setting of the linear velocity of the disk so as to maintain minimal variation of the disk rotation angular velocity at the start and end of access to the disk upon movement of said optical pick-up for access; and gradually switching the setting of the linear velocity to the predetermined value of the linear velocity set regardless of the position of said optical pick-up, after movement of said optical pick-up.

* * * * *